United States Patent [19]

Maeda

[11] Patent Number: 4,644,241
[45] Date of Patent: Feb. 17, 1987

[54] SINGLE PHASE TO THREE PHASE SIGNAL CONVERTER

[75] Inventor: Naoyuki Maeda, Aichi, Japan

[73] Assignee: Tokai TRW & Co., Ltd., Kasugai, Japan

[21] Appl. No.: 742,202

[22] Filed: Jun. 7, 1985

[30] Foreign Application Priority Data

Jun. 8, 1984 [JP] Japan ................................ 59-118009

[51] Int. Cl.⁴ ...................... H02P 7/292; H02M 5/458
[52] U.S. Cl. ...................................... 318/768; 363/36; 363/148; 363/154
[58] Field of Search ........................ 363/1, 36, 2, 4, 10, 363/148, 151, 154; 318/768

[56] References Cited

U.S. PATENT DOCUMENTS 4,060,754  11/1977  Kirtley et al. ..................... 318/768

FOREIGN PATENT DOCUMENTS 2360509  6/1975  Fed. Rep. of Germany ...... 318/768
56480    4/1980  Japan ................................. 363/4
311348   11/1971 U.S.S.R. ............................ 363/4

*Primary Examiner*—William M. Beha, Jr.
*Attorney, Agent, or Firm*—Tarolli, Sundheim & Covell

[57] ABSTRACT

An apparatus for converting a single phase electrical signal into a three phase electrical signal is disclosed. A converter includes a rectifier connectable to a single phase electrical power source. One output of the rectifier is connected through a smoothing ciruit to four switching transistors. The other output of the rectifier is connected to center taps of a first and a second load coil. The first phase load coil is connected across a first pair of the switching transistors and the second phase load coil is connected across a second pair of the switching transistors. Third and fourth phase load coils are connected to opposite sides of the first and second phase load coils. The first, second, and third phase load coils are delta connected and the first, second, and fourth phase load coils are delta connected. The first and second pairs of switching transistors are controlled by first and second pairs of phase shifting signals. Each of the first and second pairs of phase shifting signals includes positive and negative pulses which provide three phase conversion across the first, second, and third plus fourth phase load coils.

5 Claims, 3 Drawing Figures

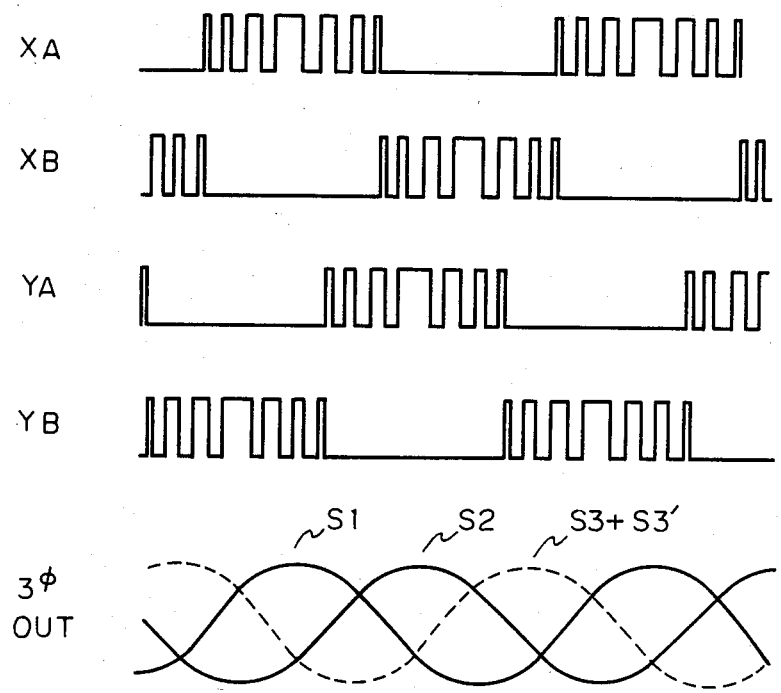

SINGLE PHASE TO THREE PHASE SIGNAL CONVERTER

FIELD OF THE INVENTION

The present invention relates to an inverter apparatus for converting a single-phase A.C. signal to three-phase A.C. signals.

BACKGROUND OF THE INVENTION (PRIOR ART)

In the prior art, an inverter apparatus for converting a single-phase signal to three-phase signals has comprised a three-phase full-wave converter circuit, as a phase shifting converter, which uses a semiconductor switching element for each of the three phases and applies three-phase A.C. signals each having a 120° phase difference therebetween to the associated load coils in the three phases.

In general, with respect to the construction of a single-phase induction motor used for an electrically powered machine such as an air conditioner, a laundry machine and a refrigerator, which may be operated by a home-wired single-phase A.C. power source, a stator may be formed by a main winding and an auxiliary winding for a starting operation and a rotor may be of a cage type. As compared with a three-phase induction motor operated by an industrial power wiring, such single-phase induction motor is inferior in starting and other electric characteristics, requires a relatively large number of elements and becomes large in size. Also, it is impossible in such single-phase induction motor to effectively provide the winding throughout the periphery of the rotor, unlike a three-phase induction motor.

In order to self-start the single-phase induction motor, it is necessary to provide a shading coil, or a centrifugal contact and a phase advance capacitor. However, this complicates the mechanism of the motor.

SUMMARY OF THE INVENTION

The present invention is directed to overcome the problems described above.

It is an object of this invention to provide an improved, or small-sized and simplified inverter apparatus for converting a single-phase A.C. power source to three-phase A.C. outputs.

Another object of this invention is to provide an inverter apparatus having a favourable starting characteristic and a high conversion efficiency.

Another object of this invention is to provide an inverter apparatus capable of easily operating three-phase powered machines by using home wiring of a single-phase A.C. power source.

Another object of this invention is to provide an inverter apparatus for converting a single-phase A.C. power source to three-phase A.C. outputs, wherein the single-phase power source is connected to a phase shifting converter circuit for converting the single-phase A.C. signal to a first and second phase-shifted output signals having a 120° phase difference therebetween, and the first phase-shifted signal is connected to a first phase load, the second phase-shifted signal is connected to a second phase load, and a signal composed by the first and second phase-shifted signals is connected to a third phase load and a fourth phase load, the third and fourth phase load being formed by dividing single load, so that three-phase power outputs are provided for the first phase load, the second phase load, and the third plus fourth phase load.

According to the present invention, it is possible to obtain the three-phase outputs from the single-phase power source by means of the phase shifting converter circuit for outputting two phase-shifted signals to apply the three-phase outputs to the load coils, thereby being capable of simplifying the phase shifting converter circuit. It is advantageous, therefore, that, as compared with a single-phase electric motor having a winding the same in size as those of a threephase motor, the phase current is small and the resistance loss is halved and, accordingly, the three-phase motor can be small-sized, assuming that there is no difference in loss therebetween.

Additionally, according to the inverter apparatus using a simplified electronic circuit for phase conversion and the method of load connection of the present invention, operation of three-phase powered machines is easily effected by using the home wiring of the single-phase A.C. power source.

BRIEF DESCRIPTION OF THE DRAWINGS

FIG. 3 shows a signal waveform diagram illustrating the operation of the circuit shown in FIG. 2.

DESCRIPTION OF THE PREFERRED EMBODIMENT

Figure 1:
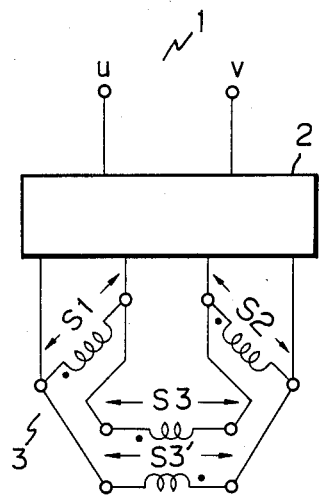
FIG. 1 shows a schematic circuit diagram embodying the inverter apparatus of the present invention.

In the inverter apparatus of the present invention, as shown in FIG. 1, a single-phase A.C. power source 1 is connected through a phase shifting converter circuit 2 to a load coil circuit 3. The phase shifting converter circuit 3 converts a single-phase A.C. signal to two phase-shifted signals for the corresponding phases S1 and S2, the signals having a 120° phase difference therebetween. By the load connection in the load coil circuit 3, the phase-shifted signals are also applied to phases S3 and S3' which act as one of three phases. The composed signal of the phases S3 and S3' has a 120° phase shift from the respective signals of the phases S1 and S2.

Figure 2:
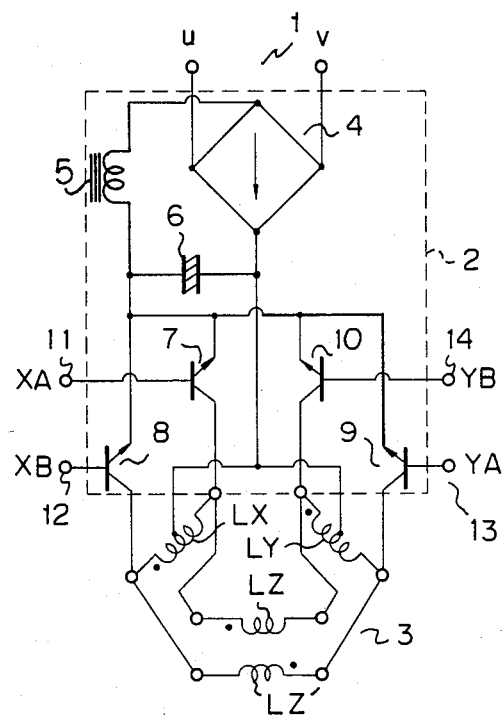
FIG. 2 shows a circuit diagram embodying the inverter apparatus and the method of the load connection of the present invention.

In FIG. 2, the power source 1 is connected to a rectifier 4 in the phase shifting converter circuit 2 through input terminals u and v. One output terminal of the rectifier 4 is connected through a smoothing circuit comprising a choke coil 5 and a capacitor 6 to each of the emitters of transistors 7, 8, 9 and 10, and the other output terminal of the rectifier 4 is connected to each of the center taps of load coils LX and LY, as described below. The bases of the transistors 7 and 9 are respectively connected to a pair of input terminals 11 and 13 to which positive pulses XA and YA are applied (See FIG. 3). Also, the bases of the transistors 8 and 10 are respectively connected to a pair of input terminals 12 and 14 to which negative pulses XB and YB are applied (See FIG. 3). Connected between the collector of the transistor 7 and the collector of the transistor 8 is the load coil LX. Connected between the collector of the transistor 9 and the collector of the transistor 10 is the load coil LY. One terminal of the load coil LX is connected through a load coil LZ to one terminal of the load coil LY, and the other terminal of the load coil LX is connected through a load coil LZ' to the other terminal of the load coil LY. In other words, the load coils LX, LY and LZ are connected to form a first delta connection and the load coils LX, LY and LZ' are connected to form a second delta connection. Thus, under a PWM control by the positive pulses XA and YA and the negative pulses XB and YB, the resulting output signals of the phase shifting converter circuit 2 are applied to the load coil LX of the S1 phase, the coil LY of the S2 phase, the coil LZ of the S3 phase and the coil LZ' of the S3' phase, so that the threephase output signals are provided for the S1 phase, the S2 phase and the S3 plus S3' phase, each of the output signals having a 120° phase difference therebetween.

The operation of the circuit shown in FIG. 2 will be explained with reference to FIG. 3. In FIG. 3, under the PWM control by the switching pulses XA, YA and XB, YB for phase conversion, an input voltage waveform of the single-phase A.C. signal applied between the input terminals u and v is converted by the phase shifting converter circuit 2 to generate two output voltage waveforms S1 and S2 having a 120° phase difference therebetween. The output voltage waveforms S1 and S2 which have the same waveform as that of the input power source are composed by the load connection as described above to generate an output voltage waveform S3+S3'. Thus, a three-phase A.C. power source is formed by the output voltage waveforms S1, S2 and S3 plus S3'.

In the preferred embodiment, the center-tapped load coils LX and LY are provided for the phase shifting converter circuit using the switching transistors and, therefore, the value of the line voltages in the load coil circuit 3 is two times of the input power source and the load coils may be of two voltage winding type commonly used for 200 and 400 volts.

What is claimed is:

1. A single phase to three phase converter comprising:

phase shifting converter means including rectifier means connected to a single-phase A.C. power source, first semiconductor switching means connected to a first pair of input terminals which receive a first pair of phase-shifting signals and connected to one terminal of the rectifier means, and second semiconductor switching means connected to a second pair of input terminals which receive a second pair of phase-shifting signals and connected to said one terminal of the rectifier;

first center-tapped phase load means connected to said first semiconductor switching means, the center tap being connected to the other terminal of said rectifier;

second center-tapped phase load means connected to said second semiconductor switching means, the center tap being connected to said other terminal of said rectifier;

third and fourth phase load means each connected to said first and second semiconductor switching means, the third and fourth phase load means being formed by dividing single phase load means, whereby first and second phase-shifted signals having a 120° phase difference therebetween and a signal composed by said first and second phase-shifted signals are respectively provided for said first, second, and third plus fourth phase load means, as three-phase power outputs.

2. The converter as set forth in claim 1 wherein each of said first and second pair of phase-shifting signals is a pair of positive and negative pulses for driving phase conversion.

3. The converter as set forth in claim 1 wherein said first, second and third phase load means are delta-connected and said first, second and fourth phase load means are also delta-connected, and the third and fourth phase load means are formed by equally dividing said single phase load means.

4. The converter as set forth in claim 1 wherein said single-phase A.C. power source is a home-wiring power source.

5. The converter as set forth in claim 1 wherein said first through fourth phase load means are the load windings of a three-phase induction motor.

* * * * *